United States Patent

Miyamoto et al.

[11] Patent Number: 6,163,655
[45] Date of Patent: Dec. 19, 2000

[54] CAMERA MAGNETIC READER HAVING SHIELD MEMBER AND GRINDING REFERENCE SURFACE, AND METHODS FOR FORMING AND POSITIONING SAME

[75] Inventors: Hidenori Miyamoto, Urayasu; Tadashi Otani, Otawara, both of Japan

[73] Assignee: Nikon Corporation, Tokyo, Japan

[21] Appl. No.: 09/050,362

[22] Filed: Mar. 31, 1998

[30] Foreign Application Priority Data

Mar. 31, 1997 [JP] Japan ................................ 9-079964
Aug. 28, 1997 [JP] Japan ................................ 9-232552

[51] Int. Cl.[7] ................................................. G03B 17/24
[52] U.S. Cl. ..................... 396/319; 29/603.16; 360/125; 360/128
[58] Field of Search ..................... 396/310, 319, 396/320, 440, 442; 360/104, 108, 109, 110, 128, 129, 125, 127; 29/603.01, 603.08, 603.04, 603.07, 603.09, 603.1, 603.16, 603.17

[56] References Cited

U.S. PATENT DOCUMENTS

| | | | |
|---|---|---|---|
| 3,233,046 | 2/1966 | Moenring | 29/603.16 |
| 3,239,914 | 3/1966 | Shirakura et al. | 29/603.16 |
| 3,432,921 | 3/1969 | Page | 29/603.16 |
| 4,713,706 | 12/1987 | Oosaka et al. | 360/104 |
| 4,872,077 | 10/1989 | Tezuka | 360/109 |
| 5,013,394 | 5/1991 | Rolland et al. | 156/627 |
| 5,136,318 | 8/1992 | Aoshima | 396/320 |
| 5,483,313 | 1/1996 | Nagao et al. | 396/320 |
| 5,600,385 | 2/1997 | Takeshita | 396/319 |

FOREIGN PATENT DOCUMENTS 6-75285  3/1994  Japan.

*Primary Examiner*—David M. Gray
*Attorney, Agent, or Firm*—Oliff & Berridge, PLC

[57] ABSTRACT

A camera magnetic reader including a magnetic head body for contacting a film, which is being fed in a camera, through a magnetic touch surface, and a shield member for covering the magnetic head body from the front side of the camera. The magnetic head body has protruding surfaces that are exposed through the shield member so as to face the front side of the camera. The head touch surface is formed by grinding with reference to the protruding surfaces. The magnetic body is mounted in the camera with the protruding surfaces serving as contact surfaces for positioning the magnetic head body. The camera magnetic reader allows accurate positioning of the magnetic head.

15 Claims, 4 Drawing Sheets

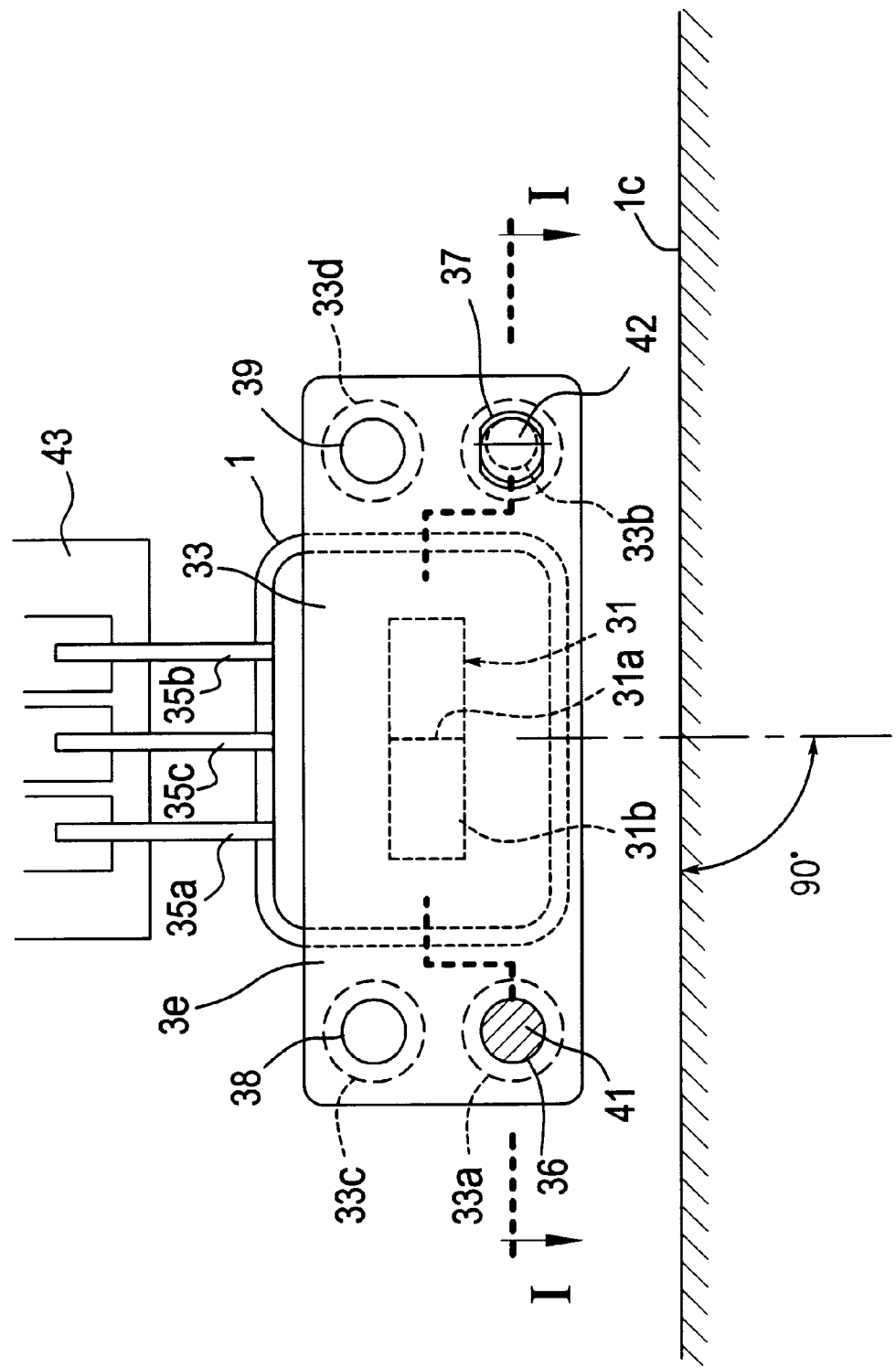

CAMERA MAGNETIC READER HAVING SHIELD MEMBER AND GRINDING REFERENCE SURFACE, AND METHODS FOR FORMING AND POSITIONING SAME

BACKGROUND OF THE INVENTION

1. Field of Invention

The present invention relates to a camera magnetic reader provided with a magnetic head which is covered by a shield member. The present invention also relates to a method for forming and positioning a camera magnetic recorder.

2. Description of Related Art

A known camera magnetic reader is provided with a magnetic head that reads magnetic information recorded on a magnetic layer of a film. Such a camera magnetic reader is disclosed, for example, in Japanese Unexamined Patent Publication No. 6-75285.

In the magnetic reader disclosed in Japanese Unexamined Patent Publication No. 6-75285, however, the magnetic head is mounted to a circuit substrate, preventing accurate positioning of the magnetic head in the forward-and-rearward direction of the camera. This may, for example, cause the magnetic head to push the film, thereby reducing the flatness of the film.

SUMMARY OF THE INVENTION

Accordingly, it is one object of the present invention to provide a magnetic reader which can allow accurate positioning of a magnetic head.

To this end, according to the present invention, there is provided a camera magnetic reader comprising a magnetic head body having a magnetic head touch surface for contacting a film. The magnetic head body has at least one reference surface and is mounted in the camera with the at least one reference surface serving as a contact surface for positioning the magnetic head body. The head touch surface is formed by grinding with reference to the at least one reference surface.

In other embodiments, the at least one reference surface may be brought into contact with a film path forming member of the camera from the back side of the camera in order to mount the head body to a film path forming member. Also, the locations of contact of the at least one reference surface with respect to the film path forming member may be shifted in order to perform azimuthal adjustment of the magnetic head body with respect to the film path forming member. The at least one reference surface may be formed so as to face the front side of the camera.

In another aspect of the invention, there is provided a method for forming a camera magnetic reader, comprising providing a magnetic head body that has at least one reference surface and forming a head touch surface on the magnetic head body by grinding with respect to the reference surface.

In a further aspect of the invention, there is provided an apparatus for adjusting a camera magnetic head body. A pressure plate is provided with a boss, and a magnetic head body is provided with a positioning hole engageable with the boss. A device is also provided that pivots the magnetic head body about the boss to thereby adjust the magnetic head body with respect to the pressure plate.

In yet another aspect of the invention, a method of adjusting a camera magnetic reader with respect to a film feeding direction is provided. A fixed member is inserted into a positioning hole of the camera magnetic reader, and the camera magnetic reader is pivoted about the fixed member to thereby adjust the camera magnetic reader with respect to the film feeding direction.

Further objects, aspects and/or advantages of the above described structures and methods will be described in or apparent from the following detailed description of preferred embodiments.

BRIEF DESCRIPTION OF THE DRAWINGS

The inventive structures and methods will be described with reference to preferred embodiments thereof, wherein:

FIG. 4 is a cross-sectional view, as viewed in the direction of line IV—IV of FIG. 1.

DETAILED DESCRIPTION OF PREFERRED EMBODIMENTS

A description will now be given of an embodiment of a magnetic reader in accordance with the present invention, with reference to FIGS. 1 to 4.

Figure 1:
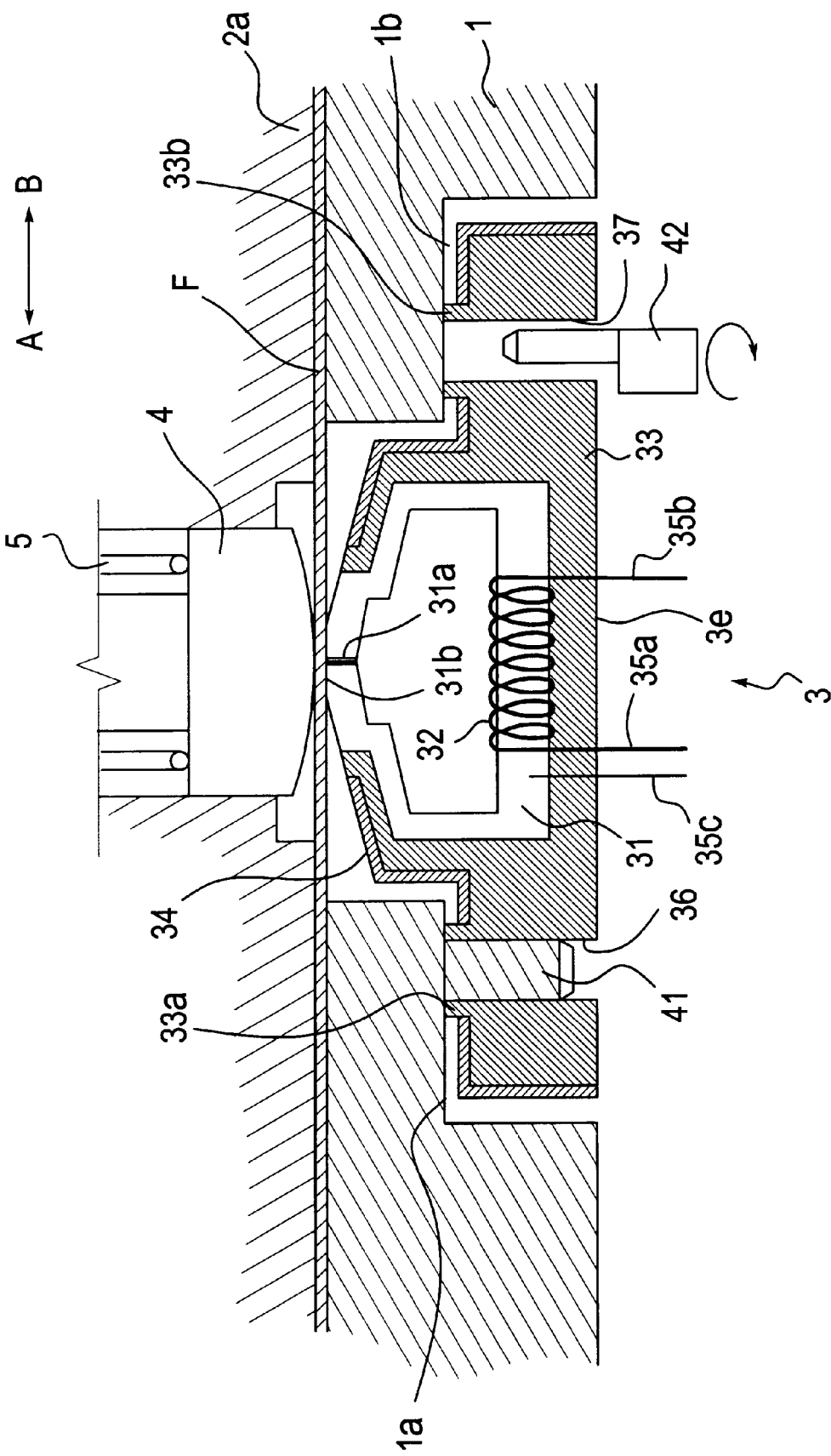
FIG. 1 is a cross-sectional view showing an embodiment of a camera magnetic reader, as viewed in the direction of line I—I of FIG. 4.

Referring to FIG. 1, a film path forming member 1 (hereinafter referred to as "pressure plate") defines the position of a film F in a direction of the optical axis. The pressure plate also determines the shape of the film F. A rail 2a on a camera body 2 is disposed along the pressure plate 1 to form a gap G between the camera body 2 and the pressure plate 1 to allow the film F to pass through (see FIGS. 1 and 3). A magnetic head 3 is mounted to the pressure plate 1 from a back surface side of the camera (that is from the surface side opposing the surface from which the photographic lens barrel protrudes). A pad 4 brings the film F into close contact with the magnetic head 3, and a compressive spring 5 biases the pad 4 towards the film F.

Figure 2:
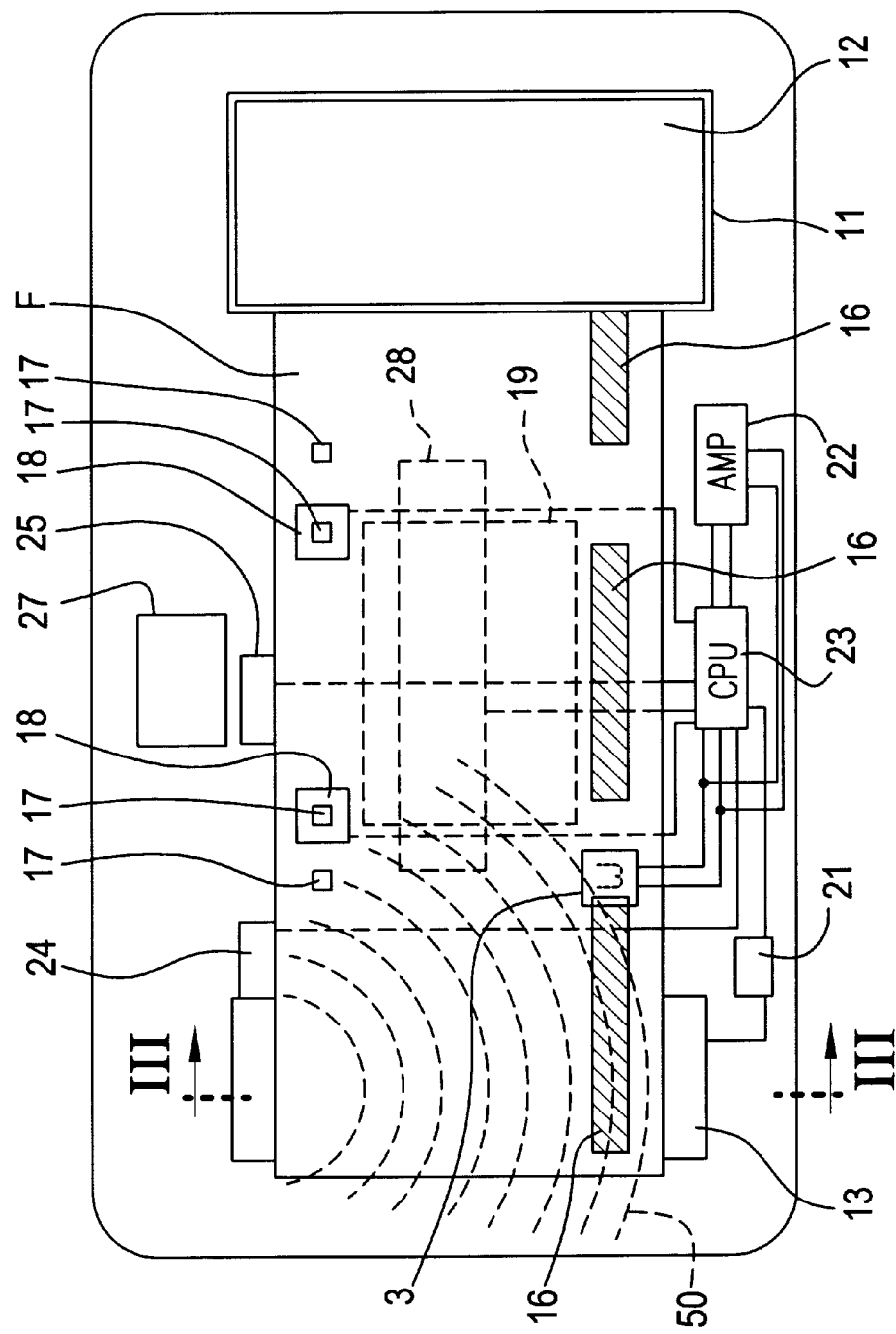
FIG. 2 is a view showing a camera provided with the magnetic reader of the embodiment in accordance with the present invention, as viewed from the rear side of the camera.
Figure 3:
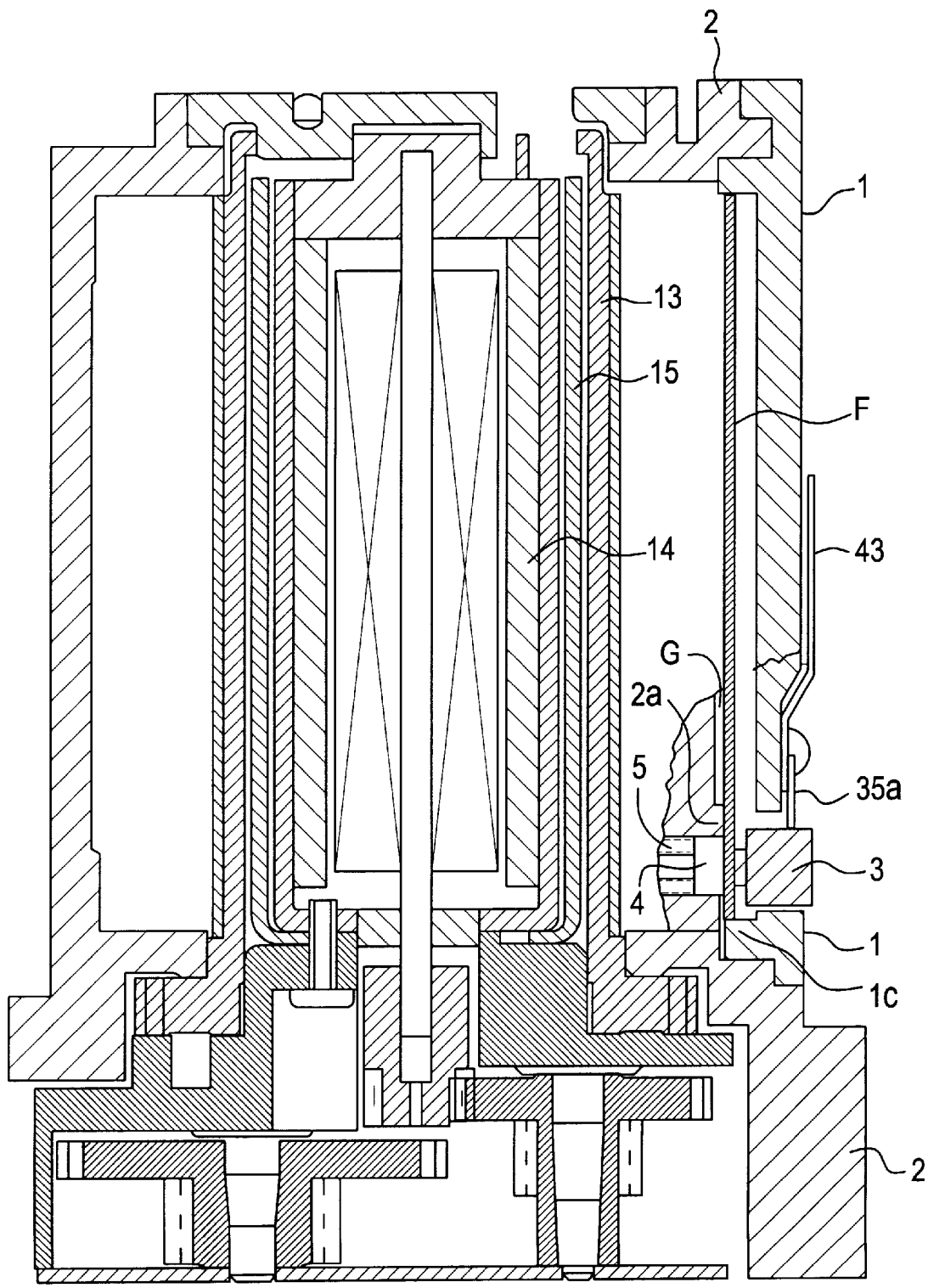
FIG. 3 is an enlarged cross-sectional view taken along line III—III of FIG. 2.

As shown in FIGS. 2 and 3, the film F, moving out from a film cartridge 12 accommodated in a cartridge chamber 11, is guided through the film path formed along the pressure plate 1, and then taken up by a take-up spool 13. As shown in FIG. 3, a motor 14, accommodated within a shield member 15, is provided in the take-up spool 13. Driving the motor causes the film F to be fed. Bringing the magnetic head 3 into close contact with the film F that is being fed allows magnetic information, recorded in magnetic recording areas 16 (see FIG. 2) of the film F, to be read.

FIG. 2 shows perforations 17 in the film F. When film feeding is controlled by detecting the perforations 17 using photointerrupters 18, which are disposed between the cartridge chamber 11 and the take-up spool 13, a film photographic frame can be made to match an image plane frame (aperture) 19. A motor driver 21 drives the motor 14. An amplifier 22 amplifies a signal output from the magnetic head 3. A central processing unit (CPU) 23 controls each part of the camera. A DC/DC converter 24 generates a voltage to be applied to, for example, a stroboscopic device by raising the voltage. A photometric-and-distance measuring unit 25 subjects a subject to photometric measurement and for measuring the distance to the subject. A finder eyepiece window 27 and a liquid crystal display unit 28 for displaying, for example, a photographic condition are also shown in FIG. 2.

As shown in FIGS. 1 and/or 4, the magnetic head 3 has a head core 31, a coil 32 wound upon the head core 31, a resin block 33 used for molding the head core 31, and a magnetic shield plate 34 made of a material with a high magnetic permeability and covering part of the resin block 33. Both ends of the coil 32 are connected externally of the magnetic head 3 through terminals 35a and 35b, while the head core 31 is connected externally of the magnetic head 3 through a terminal 35c. The terminals 35a, 35b, and 35c are connected to Flexible Printed Circuit (FPC) 43 (see FIGS. 3 and 4).

As shown in FIG. 2, the magnetic shield plate 34, which covers the magnetic head from the front surface side of the camera (FIG. 1), is used for eliminating magnetic induction in the coil 32 caused by the magnetic head 3, by blocking magnetic noise 50 that escapes from the motor 14.

As shown in FIGS. 1 and 4, a positioning hole 36, an adjustment hole 37, an adhesion hole 38, and an adhesion hole 39 extend through the resin block 33 in the forward-and-rearward direction of the camera. The positioning hole 36, the adhesion hole 38, and the adhesion hole 39 are circular in cross section, while the adjustment hole 37 is non-circular, e.g., oval-shaped, in cross section. Protrusions are formed on the resin block 33 so as to protrude in a direction towards the front surface of the camera (or the surface from which the photographic lens barrel protrudes). The protrusions are formed around the peripheries of the openings of the positioning hole 36, the adjustment hole 37, the adhesion hole 38, and the adhesion hole 39 on the side which faces the front surface side of the camera. The protrusions have annular protruding surfaces 33a, 33b, 33c, and 33d.

As shown in FIGS. 1 and 4, the shield plate 34 has openings formed around the positioning hole 36, the adjustment hole 37, the adhesion hole 38, and the adhesion hole 39, with the protruding surfaces 33a, 33b, 33c, and 33d protruding towards the front of the camera through the openings in the shield plate 34. The pressure plate 1 has mounting surfaces 1a and 1b (see FIG. 1) that face the back side of the camera. The protruding surfaces 33a and 33b contact the mounting surface 1a, and the protruding surfaces 33c and 33d contact the mounting surface 1b in order to position the magnetic head 3 in the forward-and-rearward direction (or in the direction of the photographic optical axis) of the camera.

A boss 41, which is fitted to the pressure plate 1, is inserted into the positioning hole 36, while an eccentric pin 42, which is also fitted to the pressure plate 1, is inserted into the adjustment hole 37. Inserting the boss 41 and the eccentric pin 42 into their respective holes 36 and 37 and rotating the eccentric pin 42 around the eccentric axis of the pin 42 causes the axial center of the adjustment hole 37 to move in accordance with the rotation of the eccentric pin 42, whereby the magnetic head 3 rocks on the boss 41 (or in the positioning hole 36) as center. Thus, adjusting the orientation of the eccentric pin 42 causes the locations of contact of the protruding surfaces 33b, 33c, and 33d to move with respect to the pressure plate 1, so that, as shown in FIG. 4, the mounting orientation, or azimuth, of the magnetic head 3 can be adjusted in such a way that a head gap 31a in the magnetic head 3 is set perpendicular to the direction of feeding of the film F. More specifically, the head gap 31a is set so as to be perpendicular to a rail 1c (see FIGS. 3 and 4) of the pressure plate 1 that extends parallel to the direction of film feeding.

Subsequent to adjustment of the azimuthal angle of the magnetic head 3 by using the eccentric pin 42, an adhesive is poured into the adhesion holes 38 and 39 to allow the magnetic head 3 to be fixed to the pressure plate 1. The magnetic head 3 is then mounted to the pressure plate 1 by bringing the protruding surfaces 33a, 33b, 33c, and 33d into contact with the pressure plate 1.

In the apparatus of the present embodiment, when the magnetic head 3 is being produced, the head core 31 is embedded into the resin block 33 by pouring resin into a die having the head core 31 inserted therein. Therefore, the resin block 33 has external dimensions formed with high accuracy compared with those of the head core 31, making it possible to form a head touch surface 31b by grinding with reference to the external shape of the resin block 33. In the apparatus of the present embodiment, the head touch surface 31b (see FIG. 1) is formed by grinding with reference to the protruding surfaces 33a, 33b, 33c, and 33d.

In addition, in the apparatus of the present embodiment, the magnetic head 3 is positioned in the forward-and-rearward direction of the camera with reference to the protruding surfaces 33a, 33b, 33c, and 33d, each of which are exposed through the magnetic shield plate 34 and facing towards the front side of the camera. Thus, in the apparatus of the present embodiment, the protruding surfaces 33a, 33b, 33c, and 33d, used as references for forming the head touch surface 31b by grinding, can also be used as references for mounting the magnetic head 3. In addition, the pressure plate 1, used as a mounting surface for mounting the magnetic head, is the member for regulating the position of the film F in the forward-and-rearward direction of the camera. Thus, in the apparatus of the present embodiment, the head touch surface 31b can be positioned with high precision with respect to the film F in the forward-and-rearward direction of the camera. Thus, precise positioning of the head touch surface 31b with respect to the magnetic layer of the film F can be ensured by simply adjusting the azimuth of the magnetic head 3.

In addition, in the apparatus of the present embodiment, since the magnetic head 3 is mounted to the pressure plate 1 from the rear side of the camera, the pressure plate 1 can be made thin, and the camera can be reduced in size. In contrast to this, if the magnetic head 3 were positioned by contacting it with the front surface of the pressure plate 1, a recess which is somewhat shallower than the overall height of the magnetic head 3 would have to be formed in the pressure plate 1, so that the pressure plate 1 would become thick.

It is to be noted that instead of mounting the magnetic head by mounting the exposed protruding surfaces 33a, 33b, 33c, and 33d to the pressure plate 1, as in the present embodiment, the magnetic head may be mounted to the pressure plate 1 via the magnetic shield plate. However, in this case, the magnetic shield plate is formed with external dimensions that are not consistent with those of the head core, so that the head touch surface cannot be formed by grinding with reference to the external shape of the magnetic shield plate, forcing formation of the head touch surface by grinding with reference to a surface corresponding to surface 3e (see FIG. 1) at the back side of the camera. As a result, the reference surface used for forming the head touch surface by grinding (that is, a surface corresponding to the surface 3e) is different from the mounting surface used for mounting the magnetic head to the camera (that is, the surface of the magnetic shield), thus making it impossible to precisely position the magnetic head in the forward-and-rearward direction of the camera, as is possible with the present embodiment.

The above description of preferred embodiments is intended to be illustrative and not limiting. Various alterations and modifications may be made without departing from the spirit or scope of the invention. Furthermore, various combinations of methods and structures are described above. However, each structure and method, or structural or method components thereof, may also have independent applications, as would be understood from the art.

For example, in the present embodiment, the protruding surfaces 33a, 33b, 33c, and 33d, each of which protrudes from the resin block 33, were formed. However, instead of forming protrusions on the magnetic head 3 (or the resin block 33), protrusions may be formed on the pressure plate 1 or on a member facing to the surface 3e at the back side of the camera, and brought directly into contact with the resin block 33.

Still further, although in the present embodiment the protruding surfaces 33a, 33b, 33c, and 33d, and the head touch surface 31b were formed on the same side, they do not have to be formed on the same side in other embodiments. For example, in a construction in which a wall face is formed rearwardly of the pressure plate 1, and the magnetic head is capable of being mounted to the wall face, the protruding surfaces 33a, 33b, 33c, and 33d may be formed at the opposite side from the head touch surface 31b, that is, at the back side of the camera.

According to the present invention, the magnetic head body can be accurately positioned in the forward-and-rearward direction of the camera, since the head touch surface is formed by grinding with reference to reference surfaces, and the magnetic head body is mounted in the camera with the reference surfaces serving as contact surfaces for positioning the magnetic head.

Although not exclusive, the magnetic head body may be mounted to the pressure plate, making it possible to increase the mounting precision.

What is claimed is:

1. A magnetic reader for a camera, comprising:
   a magnetic head body having a magnetic head touch surface that contacts a film; and
   a shield member covering a portion of said magnetic head body,
   said magnetic head body having at least one reference surface and being mounted in a camera with said at least one reference surface serving as a mounting surface that positions said magnetic head body relative to the camera, the at least one reference surface being exposed through said shield member and facing a front side of the camera when the magnetic head body is installed in the camera.

2. A magnetic reader for a camera according to claim 1, the camera having a film path forming member, wherein said at least one reference surface contacts the film path forming member of the camera from a back side of the camera to mount said magnetic head body.

3. A magnetic reader for a camera according to claim 1, wherein a location of contact of said at least one reference surface is movable when performing azimuthal adjustment of said magnetic head body.

4. The magnetic reader for a camera of claim 1, wherein the shield member comprises a magnetically permeable material.

5. A magnetic reader for a camera according to claim 1, wherein, when the magnetic reader is mounted in the camera, said shield member is between said magnetic reader and a front side of the camera.

6. The magnetic reader for a camera of claim 1, wherein the magnetic head body is embedded in a resin block.

7. The magnetic reader for a camera according to claim 3, wherein a positioning hole and an adjustment hole are formed in the magnetic head body.

8. The magnetic reader for a camera according to claim 7, wherein the azimuthal adjustment is carried out through an eccentric pin that rotates with respect to the camera and interacts with the adjustment hole to rotate the magnetic head body about a boss that is fixed with respect to the camera and interacts with the positioning hole.

9. A magnetic data reader for a camera, comprising:
   a body including a grinding reference structure;
   a reader attached to the body that reads magnetic data from a film via a contact surface; and
   a shield member covering a portion of the reader,
   wherein said grinding reference structure is exposed through the shield member and faces a front side of the camera.

10. The magnetic data reader of claim 9, further comprising an adjustment structure that interacts with an adjustment device when azimuthally adjusting the reader.

11. The magnetic data reader of claim 9, wherein the reference grinding structure positions the reader with respect to a path of a magnetic storage medium on the film.

12. A method of providing a camera having a magnetic reader, comprising:
   providing a magnetic head body having at least one reference surface;
   providing a shield member that covers a portion of the magnetic head body and exposes the at least one reference surface;
   forming a head touch surface on the magnetic head body by grinding a portion of the magnetic head body with respect to the at least one reference surface; and
   mounting the magnetic head body in the camera with the at least one reference surface facing a front side of the camera and contacting a mounting surface of the camera.

13. The method according to claim 12, further comprising mounting said magnetic head body in a camera from a back side of the camera.

14. The method according to claim 12, further comprising:
   providing an adjustment structure on the magnetic head body; and
   azimuthally adjusting the magnetic head body using the adjustment structure so that a head gap in a magnetic head of the magnetic head body is substantially perpendicular to a film feeding direction.

15. The method according to claim 12, further comprising fixing the magnetic head body within a camera housing using an adhesive.

* * * * *